US012691020B2

(12) United States Patent
Nail

(10) Patent No.: US 12,691,020 B2
(45) Date of Patent: Jul. 28, 2026

(54) MEDICAL PROCEDURE TABLE HAVING DETACHABLE TABLE TOP SEGMENTS

(71) Applicant: Surgix Medical LLC, Spring, TX (US)

(72) Inventor: John Patrick Nail, Bentonville, AR (US)

(73) Assignee: Surgix Medical LLC, Spring, TX (US)

( * ) Notice: Subject to any disclaimer, the term of this patent is extended or adjusted under 35 U.S.C. 154(b) by 293 days.

(21) Appl. No.: 18/432,349

(22) Filed: Feb. 5, 2024

(65) Prior Publication Data

US 2024/0261165 A1 Aug. 8, 2024

Related U.S. Application Data

(60) Provisional application No. 63/444,044, filed on Feb. 8, 2023.

(51) Int. Cl.
*A61G 13/08* (2006.01)

(52) U.S. Cl.
CPC .................................... *A61G 13/08* (2013.01)

(58) Field of Classification Search
CPC ............ A61G 13/101; A61G 2200/327; A61G 2200/325; A61G 13/0054; A61G 13/10; A61G 13/06; A61G 13/123; A61G 13/122; A61G 13/12; A61G 13/1245; A61G 13/121; A61G 13/08; A61G 7/0755; A61G 7/072; A61G 2210/50; A61G 13/0036; A61G 13/04; A61G 7/0507; A61G 5/10; A61G 13/1285; A61G 13/02
USPC ............................................ 5/624, 621, 600
See application file for complete search history.

(56) References Cited

U.S. PATENT DOCUMENTS

| | | | | |
|---|---|---|---|---|
| 4,901,964 A | | 2/1990 | McConnell | |
| 6,428,497 B1 | | 8/2002 | Crouch | |
| 8,256,050 B2 | | 9/2012 | Wong et al. | |
| 9,545,351 B2 | | 1/2017 | Sommer et al. | |
| 9,750,657 B2 | | 9/2017 | Drake | |
| 2002/0029419 A1 | * | 3/2002 | Weil | A61B 6/0487 5/601 |
| 2009/0049603 A1 | * | 2/2009 | Martin | A61G 13/0018 5/83.1 |
| 2013/0133137 A1 | * | 5/2013 | Jackson | A61B 6/0407 5/617 |
| 2013/0247301 A1 | * | 9/2013 | Daley | A61G 13/101 5/613 |

* cited by examiner

*Primary Examiner* — Madison Matthews
(74) *Attorney, Agent, or Firm* — Cochran Freund & Young

(57) ABSTRACT

A medical procedure table has a plurality of removable table top segments, each having a substantially planar top surface and downwardly-extending lips defining channels for removably seating the table top segment over corresponding parallel spars supported by the base of the table. Each table top segment can be attached at a desired position along the length of spars to create a customizable top surface for the medical procedure table, while the lips constrain lateral movement of the table top segment. Each table top segment also includes locking mechanisms that automatically grip the spars between the locking mechanisms and the lips as the table top segment is seated over the spars. These locking grip mechanisms can be manually released to reposition or remove the table top segment.

8 Claims, 6 Drawing Sheets

MEDICAL PROCEDURE TABLE HAVING DETACHABLE TABLE TOP SEGMENTS

RELATED APPLICATION

The present application is based on and claims priority to the Applicant's U.S. Provisional Patent Application 63/444,044, entitled "Medical Procedure Table Having Detachable Table Top Segments," filed on Feb. 8, 2023.

BACKGROUND OF THE INVENTION

Field of the Invention. The present invention relates generally to the field of medical procedure tables. More specifically, the present invention discloses a medical procedure table having detachable table top segments.

Background of the Invention. A wide variety of medical procedure tables have been used for many years to support patients undergoing medical procedures, such as surgery. Depending on the type of procedure, the table may be required to support the patient in any of a variety of positions.

Many surgical tables are generally configured as shown for example in FIG. 1 and include a base 12 supporting a number of lift columns 14 at either end of the table 10. The height of each lift column 14 can be independently adjusted to control the elevation, inclination and tilt of the table top. A plurality of parallel table spars 16*a*, 16*b* extend between the ends of the table 10 and are supported by the upper ends of the lift columns 14. These spars 16*a*, 16*b* support the table top and can also be used to removably attach support padding and surgical accessories to the table 10.

Facilities performing spine surgery typically need an "open top" table (i.e., without a solid table top) for lumbar procedures since the patient is in the prone (face-down) position and supported by cushions or other accessories attached to the spars of the surgical table. In contrast, a solid top table is required for cervical procedures since the patient is in the supine (face-up) position. As a result, the nursing staff is frequently required to rotate different tables in and out of the operating room to accommodate each type of surgical procedure.

The prior art in this field also includes surgical tables that allow the entire table top to be removed as a single piece. The removable top is typically large and heavy, and requires at least two people to handle. In addition, the top is typically held in place to the table with locking mechanisms that require a degree of coordinated effort to release, align and secure the top. Changing the top of such a table typically takes two people about 5-10 minutes to accomplish. As a result, these types of surgical tables with solid tops are typically not used for lumbar procedures.

Finally, the prior art includes medical procedure tables with small carbon-fiber tops that overlay onto the table spars, but these have been limited to only relatively small sections (e.g., about 12 inches) of the table top for the feet or knees. Unlike the present invention, these do not convert the entire top to a solid configuration. They also do not lock into place like the present invention, and they leave no area for connecting side rails to the spars when in place.

SUMMARY OF THE INVENTION

This invention provides a medical procedure table having a plurality of removable table top segments, each having a substantially planar top surface and downwardly-extending lips defining channels for removably seating the table top segment over corresponding parallel spars supported by the base of the table. Each table top segment can be attached at a desired position along the length of the spars to create a customizable top surface for the medical procedure table, while the lips constrain lateral movement of the table top segment. Each table top segment also includes locking mechanisms that automatically grip the spars between the locking mechanisms and the lips as the table top segment is seated over the spars. These locking grip mechanisms can be manually released to reposition or remove the table top segment.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
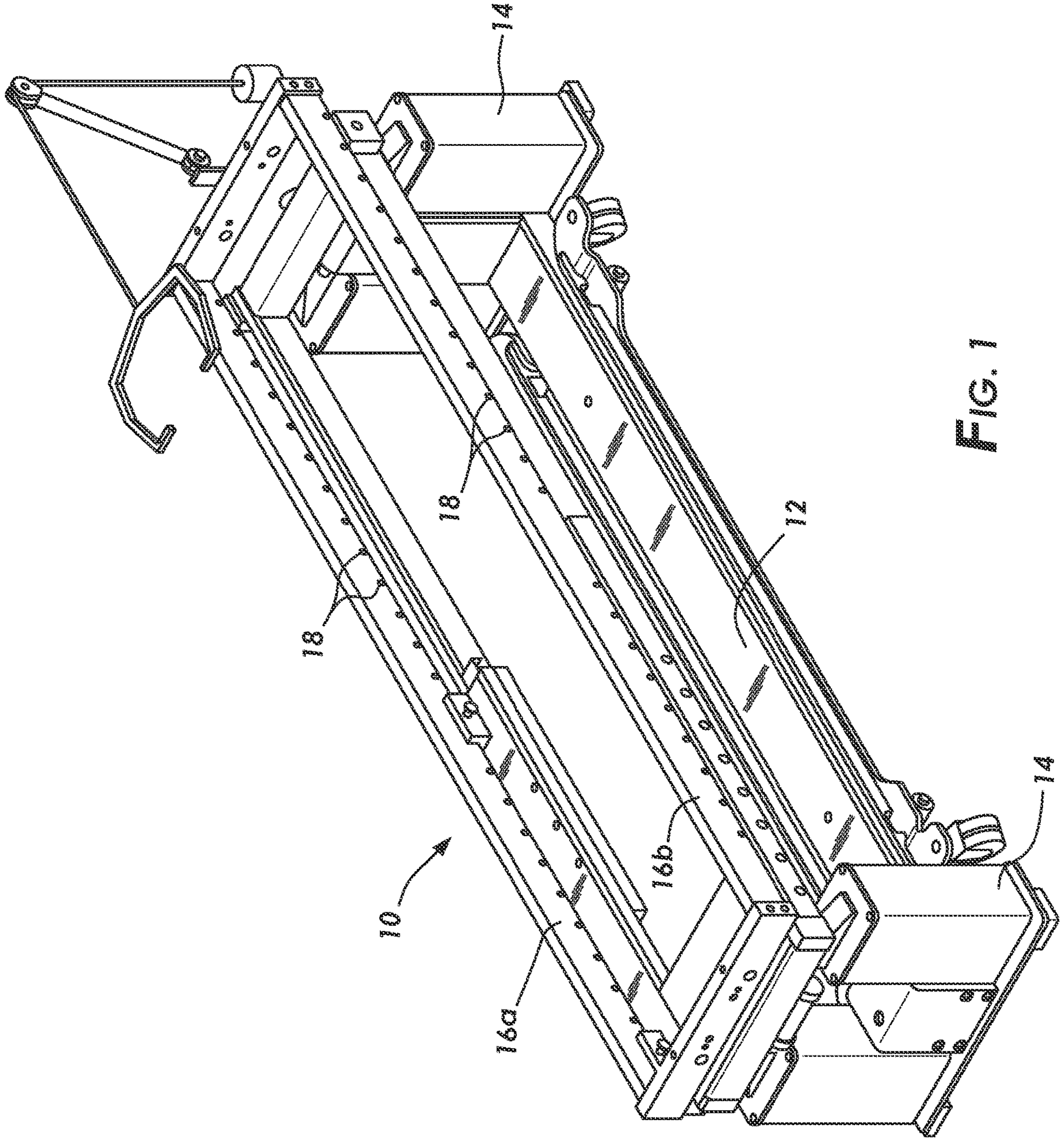
FIG. 1 is an axonometric view of a medical procedure table 10 with table spars 16*a*, 16*b*.

Turning to FIG. 1, an embodiment of the present medical procedure table 10 is shown that includes a base 12 supporting lift columns 14 at either end of the table 10. The height of each lift column 14 can be independently adjusted to control the elevation, inclination, and tilt of the table top. Two parallel table spars 16*a*, 16*b* extend between the ends of the table 10 and are supported by the upper ends of the lift columns 14. Preferably, these spars 16*a*, 16*b* are rails having a substantially rectangular cross-section with substantially vertical inner and outer lateral walls.

A number of table top segments 20 can be removably attached over the spars 16*a*, 16*b* to create a top surface for the table 10. A plurality of these table top segments 20*a*, 20*b*, etc. can be combined in series to create one continuous top operating surface, or a plurality of separate surfaces depending on where the table top segments 20*a*, 20*b*, etc. are attached along the length of the table spars 16*a*, 16*b*. Each table top segment 20 has a substantially planar top surface 22 and opposing outer lateral lips 24 that seat over the spars 16*a*, 16*b*. For example, the table top segments 20 can be made of carbon fiber composite material for light weight, strength, and rigidity. Preferably, each is about 40 inches in length. This results in a table top segment of manageable size and weight that can be easily handled by one person. The table top segments 20*a*, 20*b*, etc. can be made to weigh under 15 lbs each, making them lightweight enough that a single nurse can change the table 10 from open top to a solid top in less than one minute.

Figure 2:
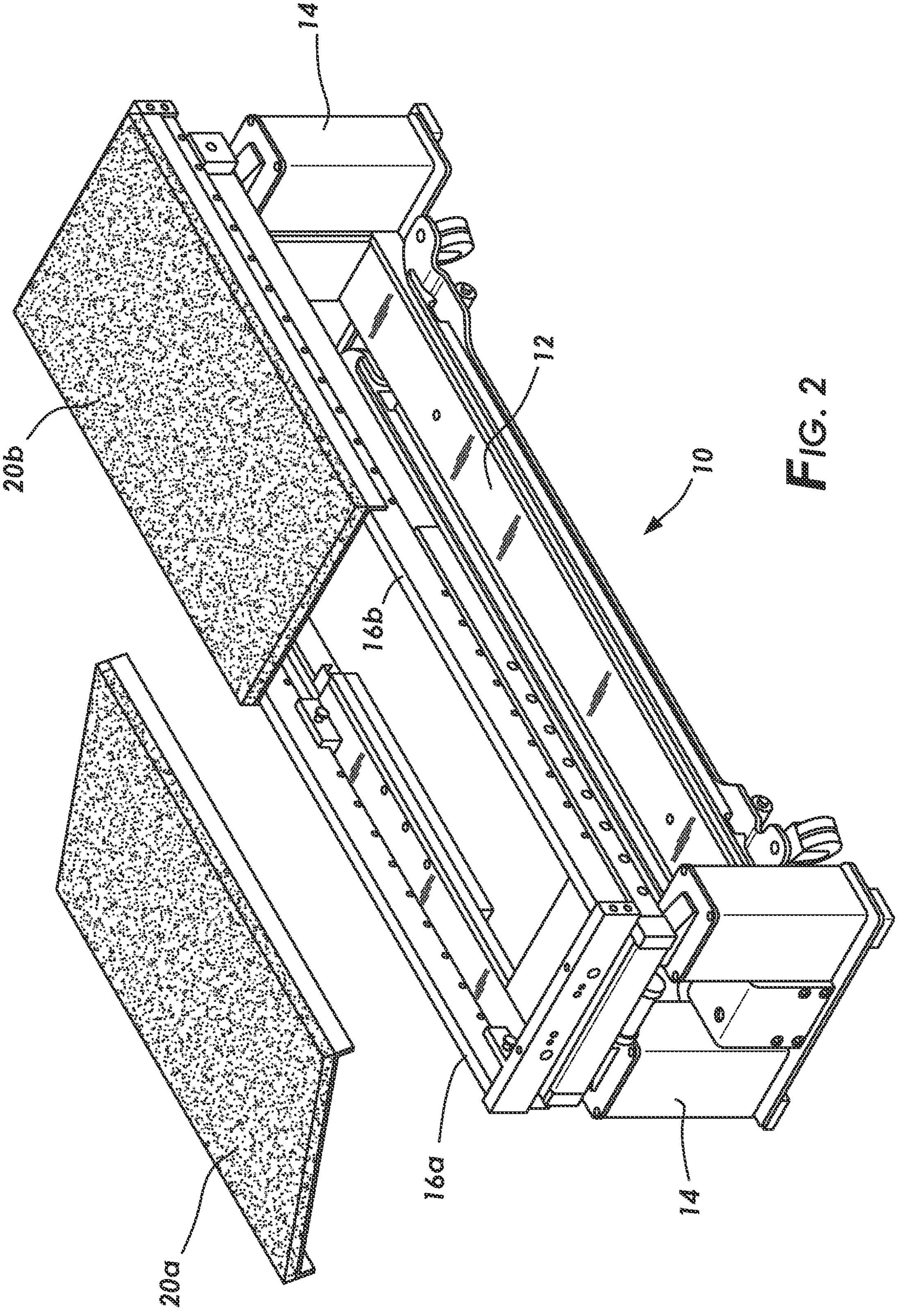
FIG. 2 is a photo showing a table top segment 20*a* being lowered onto a table 10.
Figure 3:
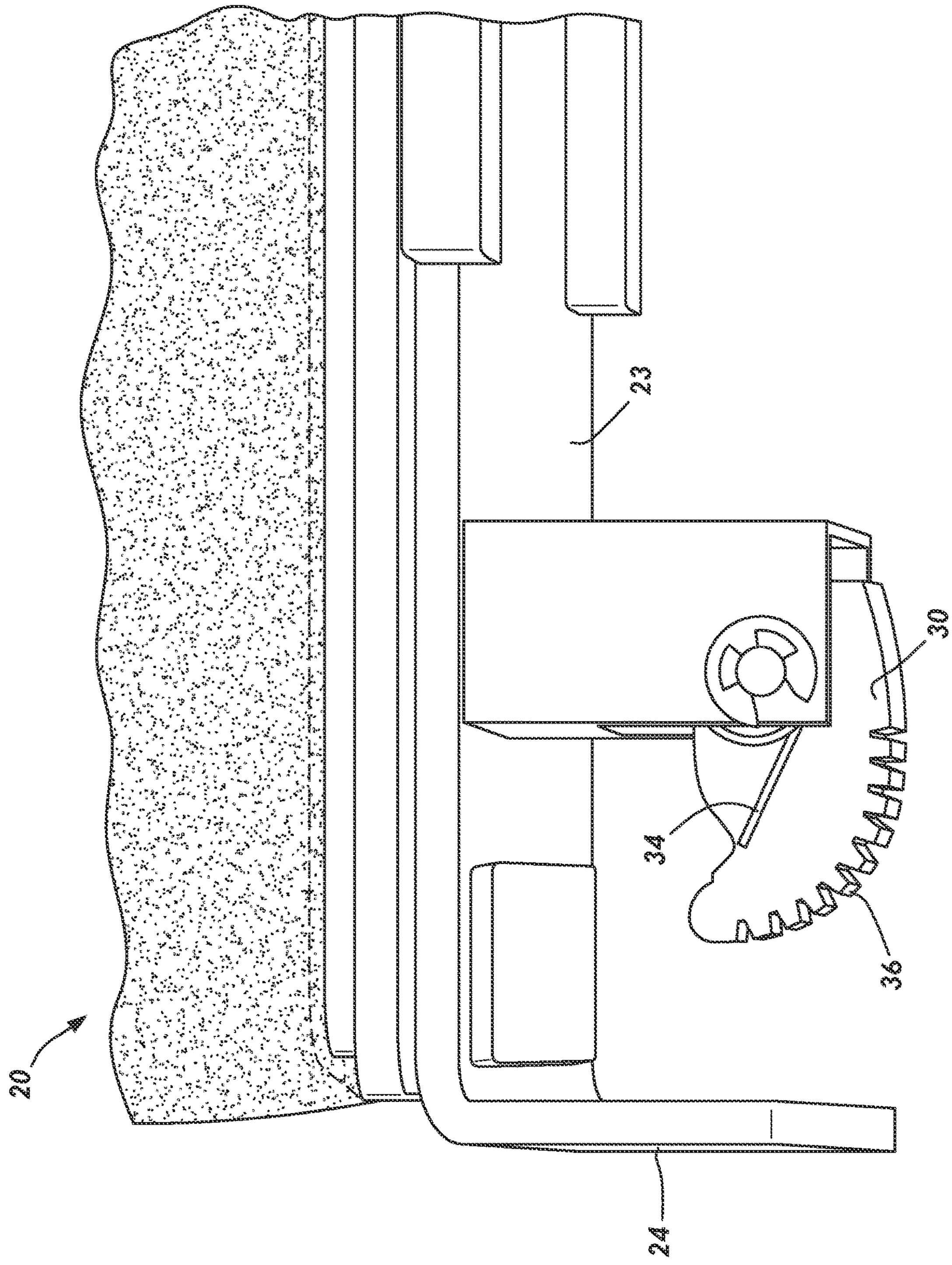
FIG. 3 is a photo of the locking mechanism and outer lip 24 of the table top segment 20.

The embodiment of the table top segment 20 shown in FIGS. 2 and 3 has opposing outer lips 24 that are parallel to and spaced apart from one another to contact the outside surfaces of the table spars 16*a*, 16*b*. These lips 24 constrain lateral movement of the table top segment 20 on the spars 16*a*, 16*b*, but allow the table top segment 20 to be readily attached at any desired location along the length of the spars 16*a*, 16*b*. This configuration also has the advantage of allowing the table top segments 20 and accessories to be mounted to the spars 16*a*, 16*b* of the table without interfering with the location or functionality of the side rails.

Alternatively, sets of opposing downwardly-extending lips can be used to seat the table segment 20 on the spars 16*a*, 16*b*. These sets of opposing lips can be used to contact either the outside or inside surfaces of the table spars 16*a*, 16*b* and thereby constrain lateral movement of the table top segment 20 on the spars 16*a*, 16*b*. Furthermore, these lips can extend the entire length of the table top segment 20 or only shorter intervals.

In yet another alternative embodiment, a set of parallel channels can be formed in the bottom of the table top segment 20 to seat over the spars 16*a*, 16*b*. Here again, the opposing sets of lateral walls of these channels serve as "lips" to constrain lateral movement of the table top segment 20 on the spars 16*a*, 16*b*, but allow it to be readily attached at any desired location along the length of the spars 16*a*, 16*b*. These channels should be viewed as functional equivalents of the downwardly-extending lips described above.

Each of the table top segments 20*a*, 20*b*, etc. has built-in locking mechanisms 30 on the bottom 23 of the table top segment to secure it to the spars 16*a*, 16*b* of the table 10. Preferably, each table top segment 20 is equipped with at least two rubberized cam-shaped locking grips 30 that grasp both table spars 16*a*, 16*b* to removably secure the table top segment 20 in its desired position with respect to the table 10.

One possible embodiment of the locking mechanism is illustrated in FIG. 3. The locking mechanism includes a cam-shaped locking grip 30 that is mounted to the bottom 23 of the table top segment 20 at a predetermined distance from the outer lip 24 (i.e., on opposing sides of the channel) so that it can pivot to a degree about its center of rotation 32 between a released position and a locked position. In the released position, the locking mechanism is prepared to receive and engage a spar 16 in the channel.

Figure 6:
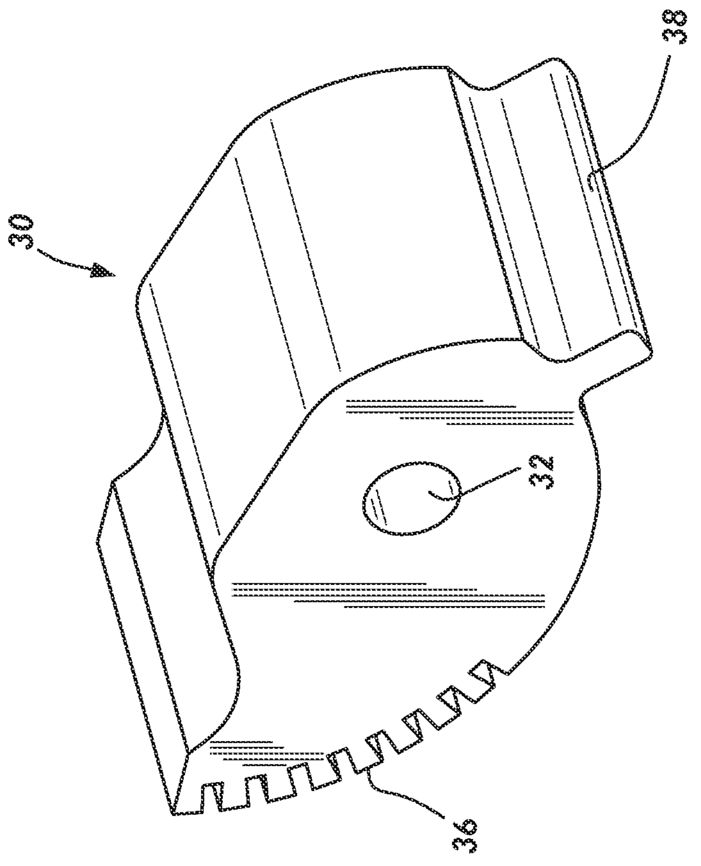
FIG. 6 is an axonometric view of the cam-shaped locking grip 30 of the locking mechanism.

As shown in FIG. 6, at least a portion of the outer perimeter of the locking grip 30 is curved or spirals radially outward from the center of rotation 32 (similar to a nautilus) to define a contact surface 36 facing the adjacent outer lip 24 that is compressed against the adjacent (inner) side of the spar 16 as the table top segment 20 is seated over the spars and the locking grip 30 rotates to its locked position. This contact surface 36 can be equipped with a series of rubber or elastomeric teeth that increase friction and are compressed against the spar 16.

Figure 4:
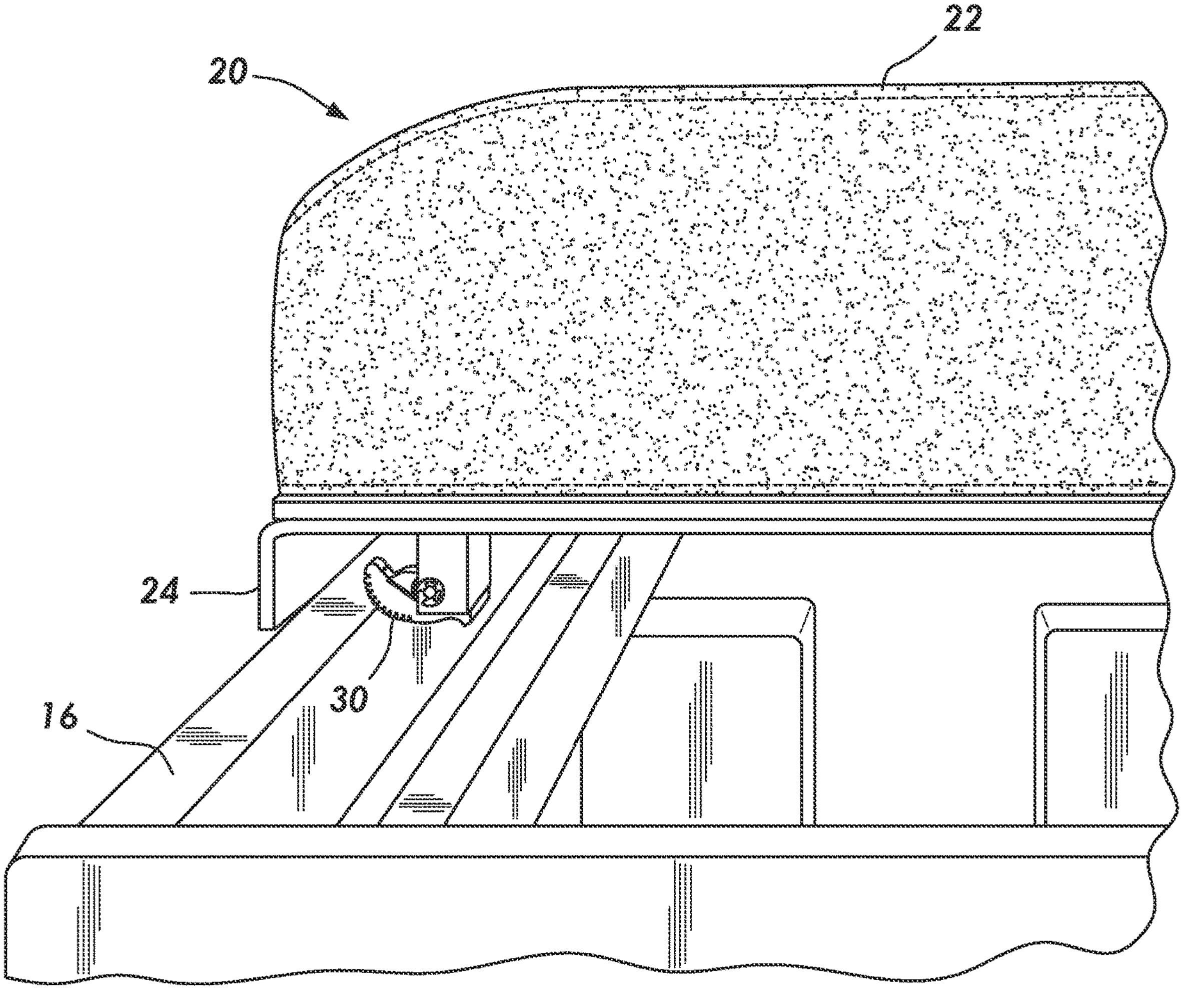
FIG. 4 is a photo showing the locking mechanism of the table top segment being lowered onto a spar 16.
Figure 5:
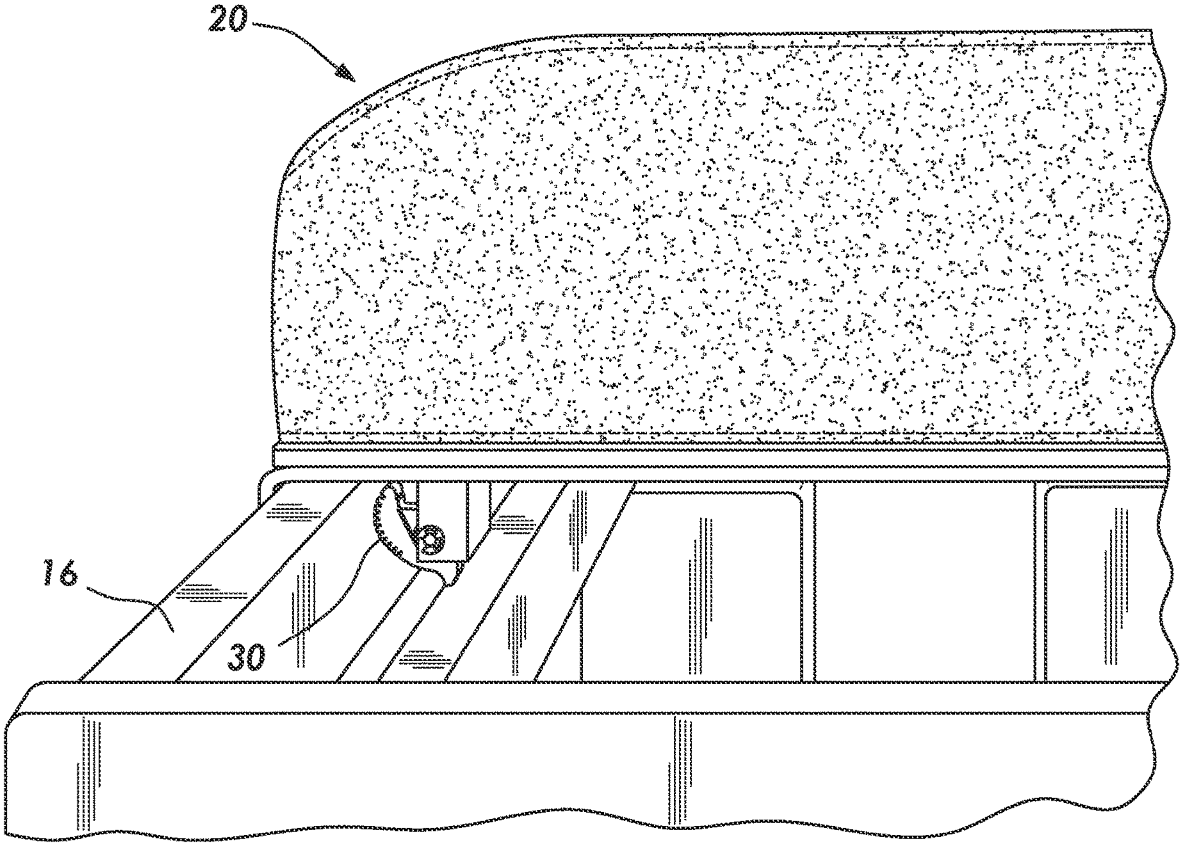
FIG. 5 is a photo showing the locking mechanism engaging a spar 16.

As illustrated in FIG. 4, a spring 34 biases the rotational position of the locking grip 30 so that the tip of its contact surface 36 protrudes into the channel for the spar 16 (i.e., the space toward the adjacent outer lip 24), and then comes into initial contact with the spar 16 as the table top segment 20 is seated over the spars. After this initial contact, further lowering of the table top segment 20 onto the spars 16*a*, 16*b* causes the locking grip 30 to rotate about its center of rotation 32, and also causes the teeth on the contact surface 36 of the locking grip 30 to progressively compress against the adjacent side of the spar 16. In this locked position, the spar 16 is effectively gripped between the contact surface 36 of the locking grip 30 and the adjacent lip 24 by the compressive force exerted by the locking grip 30 as shown in FIG. 5. It should be noted this locking action occurs automatically as the table top segment 20 is lowered onto the spars. The spring 34 also biases the locking grip 30 to remain in its released position to receive a spar 16.

Preferably, the locking mechanisms are arranged in opposing sets, so that some of the locking grips exert a compressive force against the inside lateral surface of the spars 16*a*, 16*b*, while other locking grips exert a compressive force against the outside lateral surface of the spars. This arrangement results in the locking mechanisms securely gripping both sides of the spars to securely hold the table top segment in place on the spars.

The locking mechanism is also provided with a release handle 38 extending radially outward from the locking grip 30. The user can manually rotate the locking grip 30 by means of this release handle 38 from the locked position to its initial unlocked position to release the table top segment 20 and allow it to be removed or repositioned. Thus, the locking grips 30 allow the table top segments 20 to be firmly secured to the table spars 16*a*, 16*b* while also allowing for easy removal of the table top segments 20 when not required. Alternatively, other types of locking mechanisms could be employed to provide a friction fit between the table top segments 20 and the spars 16*a*, 16*b*.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A medical procedure table comprising:
- a base;
- a plurality of parallel spars supported above the base, each spar having inner and outer lateral walls; and
- a plurality of table top segments detachable from the spars, each table top segment having:
  - (a) a substantially planar top surface;
  - (b) a bottom with a plurality of parallel channels for receiving the spars as the table top segment is seated over the spars and constraining lateral movement of the table top segment on the spars; and
  - (c) a plurality of locking mechanisms adjacent to the channels to removably secure the table top segment at a position along the spars, each locking mechanism having a locking grip automatically rotating between: (i) a released position in which a table top segment of the plurality of table top segments is configured to detach from the spars; and (ii) a locked position in which the locking grip is compressed against a spar to thereby automatically secure the table top segment to the spar as the table top segment is seated over the spars; wherein the locking grip has a contact surface curving radially outward from a center of rotation with a tip extending into a channel in the released position, and wherein said tip comes into contact with a spar and automatically rotates the locking grip to the locked position with the contact surface compressed against the spar as the table top segment is seated over the spars.

2. The medical procedure table of claim 1 wherein the channels comprise lips extending downward from the table top segment, and the locking mechanisms are located adjacent to the channels opposite the lips, whereby the spars are gripped between the lips and the locking mechanism.

3. The medical procedure table of claim 1 wherein the channels comprise lips extending downward from the table top segment over the outer lateral walls of the spars as the table top segment is seated over the spars, and the locking mechanisms are located adjacent to the inner lateral walls of the spars, whereby the spars are gripped between the lips and the locking mechanism.

4. The medical procedure table of claim 1 wherein the locking grip is cam-shaped.

5. The medical procedure table of claim 1 wherein the locking mechanism further comprises a spring biasing a rotational position of the locking grip to remain in the released position when the table top segment is not seated over the spars.

6. A medical procedure table comprising:

a base;

a plurality of parallel spars supported above the base, each spar having inner and outer lateral walls; and a plurality of table top segments detachable from the spars, each table top segment having:

(a) a substantially planar top surface;

(b) lips extending downward from the table top segment to define channels for receiving the spars and constraining lateral movement of the table top segment on the spars; and (c) locking mechanisms adjacent to the channels at a position along the spars, each locking mechanism having a cam-shaped locking grip automatically rotating between: (i) a released position in which a table top segment of the plurality of table top segments is configured to detach from the spars; and (ii) a locked position in which the locking grip is compressed against a spar to grip the spar between the locking grip and at least one lip to automatically secure the table top segment to the spar as the table top segment is seated over the spars; wherein the locking grip has a contact surface curving radially outward from a center of rotation with a tip extending into a channel in the released position, and wherein said tip comes into contact with a spar and automatically rotates the locking grip to the locked position with the contact surface compressed against the spar as the table top segment is seated over the spars.

7. The medical procedure table of claim 6 wherein the channels comprise lips extending downward from the table top segment over the outer lateral walls of the spars as the table top segment is seated over the spars, and the locking mechanisms are located adjacent to the inner lateral walls of the spars, whereby the spars are gripped between the lips and the locking mechanism.

8. The medical procedure table of claim 6 wherein the locking mechanism further comprises a spring biasing a rotational position of the locking grip to remain in the released position when the table top segment is not seated over the spars.

* * * * *